(12) United States Patent
Dupont et al.

(10) Patent No.: US 8,489,608 B2
(45) Date of Patent: Jul. 16, 2013

(54) METHOD FOR DEFINING DATA CATEGORIES

(75) Inventors: Joel Dupont, Redwood Shores, CA (US); Andrew Ioannou, San Francisco, CA (US); John Finnegan, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 12/686,319

(22) Filed: Jan. 12, 2010

(65) Prior Publication Data

US 2010/0179952 A1  Jul. 15, 2010

(30) Foreign Application Priority Data

Jan. 13, 2009 (GB) .................................. 0900504.2

(51) Int. Cl.
  *G06F 7/00* (2006.01)
  *G06F 17/30* (2006.01)
(52) U.S. Cl.
  USPC ............................ 707/740; 707/759; 707/771
(58) Field of Classification Search
  None
  See application file for complete search history.

(56) References Cited

U.S. PATENT DOCUMENTS

| | | |
|---|---|---|
| 5,933,145 A | 8/1999 | Meek |
| 5,950,190 A * | 9/1999 | Yeager et al. ........................ 1/1 |
| 5,963,938 A * | 10/1999 | Wilson et al. ........................ 1/1 |
| 6,353,844 B1 | 3/2002 | Bitar et al. |
| 6,658,404 B1 | 12/2003 | Cecchini |
| 6,925,608 B1 | 8/2005 | Neale et al. |
| 7,010,523 B2 * | 3/2006 | Greenfield et al. .................... 1/1 |
| 8,214,383 B2 * | 7/2012 | Dettinger et al. ............. 707/766 |
| 2003/0163455 A1 * | 8/2003 | Dettinger et al. ................ 707/3 |
| 2003/0229621 A1 * | 12/2003 | Carlson et al. .................... 707/2 |
| 2004/0085362 A1 * | 5/2004 | Sauermann et al. .......... 345/777 |
| 2005/0192940 A1 * | 9/2005 | Morris ............................... 707/3 |
| 2005/0198636 A1 | 9/2005 | Barsness et al. |
| 2006/0053096 A1 * | 3/2006 | Subramanian et al. ........... 707/3 |
| 2006/0095407 A1 | 5/2006 | Ortega et al. |
| 2006/0161466 A1 * | 7/2006 | Trinon et al. ...................... 705/7 |
| 2006/0224574 A1 * | 10/2006 | Dettinger et al. ................ 707/3 |
| 2006/0224959 A1 * | 10/2006 | McGuire et al. .............. 715/700 |

(Continued)

FOREIGN PATENT DOCUMENTS

JP  2008-107875 A  5/2008

OTHER PUBLICATIONS

GB Search Report for Application No. GB0900504.2 dated Apr. 29, 2010, p. 1.

(Continued)

*Primary Examiner* — Wilson Lee
*Assistant Examiner* — Jessica N Le
(74) *Attorney, Agent, or Firm* — Kilpatrick Townsend & Stockton LLP

(57) ABSTRACT

A method for the definition of data categories is described. The method uses logic templates and may be used in database processing. One embodiment of the method comprises: selecting a plurality of attributes from a group of attributes, each attribute describing a possible data item in a set of data; selecting a logic template from a group of logic templates, each logic template comprising a predetermined logic expression containing one or more variables; and assigning one or more selected attributes to each variable within the selected the logic template to produce a logic expression defining the data category. A computer program product and a user interface for achieving this method are also described.

24 Claims, 3 Drawing Sheets

U.S. PATENT DOCUMENTS

| | | | |
|---|---|---|---|
| 2006/0235828 A1* | 10/2006 | Dettinger et al. | 707/3 |
| 2007/0027851 A1* | 2/2007 | Kruy et al. | 707/3 |
| 2007/0038597 A1* | 2/2007 | Sauermann | 707/3 |
| 2007/0039049 A1* | 2/2007 | Kupferman et al. | 726/22 |
| 2007/0050701 A1* | 3/2007 | El Emam et al. | 715/505 |
| 2007/0094340 A1* | 4/2007 | Zondervan et al. | 709/206 |
| 2007/0100809 A1* | 5/2007 | Dettinger et al. | 707/4 |
| 2007/0130548 A1* | 6/2007 | Zhaksilikov et al. | 716/1 |
| 2007/0220516 A1 | 9/2007 | Ishiguro et al. | |
| 2008/0016253 A1* | 1/2008 | Boctor | 709/250 |
| 2008/0133468 A1* | 6/2008 | Dettinger et al. | 707/2 |
| 2009/0024593 A1* | 1/2009 | Allen et al. | 707/4 |
| 2009/0055438 A1* | 2/2009 | Dettinger et al. | 707/104.1 |
| 2009/0125459 A1* | 5/2009 | Norton et al. | 706/10 |
| 2010/0088672 A1* | 4/2010 | Langworthy et al. | 717/109 |
| 2010/0121869 A1* | 5/2010 | Biannic | 707/759 |
| 2010/0161646 A1* | 6/2010 | Ceballos et al. | 707/769 |
| 2012/0265777 A1* | 10/2012 | Dettinger et al. | 707/761 |

OTHER PUBLICATIONS

International Search Report for PCT/US2008/080022 filed Oct. 15, 2008.

\* cited by examiner

Attributes      105

| 120 | No. 125 | Attribute Name 130 | Type 135 |
|---|---|---|---|
| + | - | 1 | Foo | project |
| + | - | 2 | standard | hours type |
| + | - | 3 | Gee | project |
| + | - | 4 | overtime | hours type |
| + | - | | | |

Logic      110

○ Group A matches

○ Both Group A and Group B match

○ Either Group A or Group B match

145
⦿ Group A and Group B both match or Group C matches

○ Either Group A or Group B match and Group C matches

○ All of Group A, Group B and Group C match
    140

Group Selection      115

| Group A | Any | Group B | Any | Group C | All |
|---|---|---|---|---|---|
| ☐ 1 | | ☒ 1  155 | | 160 ☐ 1 | |
| ☒ 2 | | ☐ 2 | | ☐ 2 | |
| ☐ 3 | | ☒ 3 | | ☐ 3 | |
| ☐ 4  150 | | ☐ 4 | | 16 ☒ 4 | |

| Expression: | The time category will result in a match when any attributes in Group A (standard hours) are met AND when any attributes in Group B (project Foo or Gee) are met, OR when all attributes in Group C (overtime hours) are met. |
|---|---|
| 170 | 175 |

METHOD FOR DEFINING DATA CATEGORIES

CROSS-REFERENCES TO RELATED APPLICATIONS

This application claims priority to DE 0900504.2, filed Jan. 13, 2009. The disclosure of PCT/US2008/080022 is hereby incorporated by reference in its entirety for all purposes.

BACKGROUND OF THE INVENTION

1. Field of the Invention

The present invention is in the field of data management. In particular, the present invention relates to a method for the definition of data categories that uses logic templates. Such a method may be used in database processing. The present invention also relates to a computer program product and a user interface for achieving this method.

2. Description of the Related Art

In many businesses and organizations, there is a requirement to maintain time and labor data. For example, time spent on a particular project, including overtime, may need to be recorded, together with vacation hours. Often this time and labor data needs to be managed in a coherent manner across many different operational areas, such as human resources, payroll and project management. To facilitate this data management, a centralized time recording user interface may be provided, for example as a web application.

When dealing with such data in a centralized system, there is the problem of adequately providing the data categories needed for efficient processing of the time and labor data. As many modern systems need to aggregate data from a wide variety of sources, it is difficult to predetermine all the necessary data categories during application development. Thus there is a need to enable data categories to be easily defined after development.

Within the art, there is also the problem that the definition of data categories is a complex technical process. In the prior art, a user may be first presented with a database containing time and labor data. They will then have to link this data in a particular way in order to generate a required data category. Typically, this involves manually entering a Boolean logic expression. Even when dealing with basic expressions, such an operation may be difficult for experienced data programmers and almost impossible for users with a limited knowledge of logical syntax. Such difficulty also increases with the size and complexity of the time and labor database. Thus, there is also the need to provide a simple way for a user to define a data category.

BRIEF SUMMARY OF THE INVENTION

In accordance with a first aspect of the invention there is provided a method for defining categories for a set of data comprising selecting a plurality of attributes from a group of attributes, each attribute describing a possible data item in the set of data; selecting a logic template from a group of logic templates, each logic template comprising a predetermined logic expression containing one or more variables; and assigning one or more selected attributes to each variable within the selected the logic template to produce a logic expression defining the data category.

This method allows a data category to be quickly and easily defined. Hence the method can be carried out by a functional user, i.e. someone without a high level of technical knowledge. Each attribute may be defined by a value. If such a value is not unique a hierarchy of types may be used, for example a value of "Foo" may be associated with a "project" attribute type. If such an attribute is selected and assigned to a variable in the logic template, then the definition of the data category would involve "Foo project" data; for example, data items may need to be assigned (or, alternatively, not assigned to the "Foo project") to fall within the data category. At the simplest level, the logic template may specify a single variable, or a group or set of variables, each variable being assigned an attribute. For example, to fall within the data category, data items may simply require an attribute with a value of "non-chargeable". At more complex levels, the logic template may have multiple variables or groups of variables, the multiple variables or groups being connected by various logic operators, such as AND, OR, XOR, NOT etc. One particular advantage of the method is that it allows these more complex expressions to be understood and constructed without a detailed knowledge of logic theory.

The data category may comprise a category for time data and/or the plurality attributes may comprise time attributes. Whilst the method and other aspects of the present invention have been implemented in the context of time data, they may also be applied to other situations wherein data categories need to be defined by a functional user.

In certain embodiments, the predetermined logic expression comprises two or more logic groups of one or more variables linked by a logical operator. In adaptations of this embodiment, the step of assigning may further comprise assigning one or more selected attributes to each logic group. A predetermined logic rule may be selected for each logic group to provide definitions for governing the relationship between the attributes in each logic group. The selected logic group thus forms part of the logic or logical expression defining the data category. Defining logic groups increases the power of the resultant logic expression and allows more complex categories to be defined whilst still remaining understandable to a non-technical user.

Typically, the data category is used in database operations, such as validation and/or approval. For example, time data constituting overtime work may need to fall within a particular data category to be approved. Such a data category may be defined using the present method. Alternatively, one or more data categories may be defined to validate data entry in a centralized time recording system. These data categories may be created after development thus enabling a data processing system to be expandable and adaptable to novel situations. Thus less time needs to be spent attempting to pre-empt the use of the data processing system and the data processing system can adapt to unseen developments as data categories may be defined "on-the-fly" when required.

The method may further comprise generating a natural language statement describing the logic expression defining the data category; for example, an English description of the logic expression that may be understood by a non-technical user. This step may be added to any embodiment of the invention.

The method may also further comprise adding, editing or removing a logic template from the group of logic templates. This step may be added to any embodiment of the invention.

According to a second aspect of the present invention, there is provided a system for defining categories for a set of data comprising a storage device for storing instructions for implementing the method specified above or any variations of the method; and a processor adapted to process said instructions.

According to a third aspect of the present invention there is provided a computer-program product for defining categories for a set of data comprising computer-program code that when implemented by a processor displays a user interface; computer-program code that when implemented by a processor provides a first user interface component which enables a user to select a plurality of attributes from a group of attributes, each attribute describing a possible data item in the set of data; computer-program code that when implemented by a processor provides a second user interface component which displays a group of logic templates, each logic template comprising a predetermined logic expression containing one or more variables, and which enables a user to select a particular logic template from the group; and computer-program code that when implemented by a processor provides a third user interface component which displays the selected attributes in a format determined by the selected logic template and which enables a user to assign one or more of said attributes to each variable within said template to produce a logic expression defining the data category.

The third aspect of the present invention provides similar advantages to the method specified above. In particular, a user interface so defined enables a functional user to construct logic expressions defining data categories simply and easily, wherein the various components of the user interface may guide the user through the stages required to produce a data category definition. The third aspect of the invention may be adapted in a similar manner to that previously described for the first aspect of the invention.

According to a fourth aspect of the invention there is provided a user interface for defining categories for a set of data comprising a first user interface component which enables a user to select a plurality of attributes from a group of attributes, each attribute describing a possible data item in the set of data; a second user interface component which displays a group of logic templates, each logic template comprising a predetermined logic expression containing one or more variables, and which enables a user to select a particular logic template from the group; and a third user interface component which displays the selected attributes in a format determined by the selected logic template and which enables a user to assign one or more of said attributes to each variable within said template to produce a logic expression defining the data category.

The fourth aspect also provides the advantages described above and may also comprise the variations discussed above with relation to the other aspects.

BRIEF DESCRIPTION OF THE DRAWINGS

An exemplary embodiment of the invention will now be described in relation to the accompanying drawings, in which:

FIG. 1 shows an exemplary user interface for implementing the present invention;

DETAILED DESCRIPTION OF THE INVENTION

Figure 2:
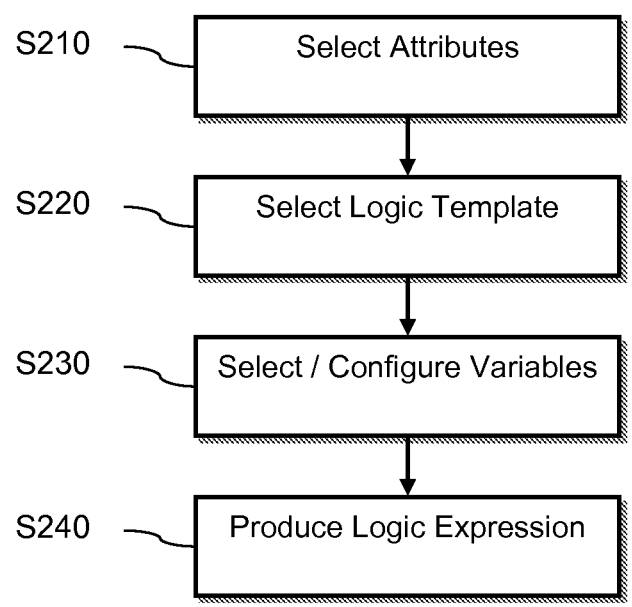
FIG. 2 shows a set of exemplary method steps that may be used to create a data category definition according to the present invention.

The present invention will now be described with relation to a particular example concerning data category definitions for time data, for use in a time and labor management application. However, the present invention may also be equally applied to other forms of data and data processing systems.

A functional, i.e. non-technical, user involved with the administration of a time and labor management application may wish to define a data category to be used when processing time-entry data. In the prior art, such a functional user would have required technical knowledge, including knowledge of logic operations, or would need to call upon someone with such knowledge. Furthermore, as there was no way to visualize the final logic expression that was used to define a data category, data categories were often ill-defined which lead to errors in data processing.

FIG. 1 shows an exemplary user interface 100 that may be used to implement a method of defining data categories according to the present invention. Such a user interface 100 may be shown on a display or touch-screen device, i.e. may be graphical. The user interface 100 comprises three main control components: an attribute component 105 for selecting data attributes to be used to define a data category, a logic component 110 that enables a user to select a predetermined logic template and a group selection component 115 to enable the user to assign certain attributes selected using attribute component 105 to particular variables or variable groups in the logic template selected using the logic component 110. The user interface 100 of FIG. 1 also shows a results section 170 that outputs a natural language, in this example non-technical English, definition of the generated data category in a manner to be understood by a non-technical user.

In the present case, a "control component" is a user interface component that operates to graphically display information to the user and allow the user to enter information by selecting and manipulating display elements with one or more input devices. Such components may be implemented solely using electronic circuitry (hardware), solely using programmable code (software) or using a mixture of the two approaches (for example, programmable logic). Various implementation methods are well known in the art and will depend on the implementation platform. The present invention may also be implemented using a non-graphical interface if required by converting the user interface shown in FIG. 1 into its appropriate text equivalent.

The use of the interface of FIG. 1 will now be described in relation to the method of FIG. 2. In other embodiments the method of FIG. 2 may also be applied without using the interface 100 of FIG. 1. At step S210, a user selects a number of attributes. The attributes shown in the attribute component 105 of FIG. 1 are time-entry attributes that have been selected to define a time data category. These time-entry attributes are typically predefined within the database or data management system that will use the defined data category; for example, they may be attributes of a database used to implement a centralized time-recording system.

In use of a time recording system, a user may enter time and labor data into a representation of a time card; for example, through a Hypertext Markup Language (HTML) interface the user may enter data recording eight hours of work. The user may then assign zero or more attributes to that data. In a simple example each attribute may be represented by a unique value. Hence, to assign an attribute to a data entry the user may select an attribute value from a given list of attribute values; for example "chargeable" or "non-chargeable"

In a more complex example, attributes may be grouped by a particular type. Such an example is shown in FIG. 1. Here, "project" is an attribute type that may have values "Foo" or "Gee". The attribute types may be transparent to the user who may simply assign a value of "Foo" or "Gee" to any time data entered into the time recording system. Likewise, time entered into a time recording system may also have an "hours" attribute type; some examples of possible values of the "hours" type are shown in FIG. 1: e.g. "standard" or "overtime". The combination of attribute value and type may be defined, amongst others, in the following manner: "project=Foo", "<<project>>Foo" or "Foo/*project*/". For example, if a user enters 8 hours worth of work into a time card system via a web application they may define 4 of those hours as working on project Foo as part of salaried (standard) time and 4 hours working on project Gee charged at overtime. Typically, attribute types are used when there are non-unique attribute values.

In the user interface 100 shown in FIG. 1, the user adds or removes time-entry attributes from a group of predefined time-entry attributes using the "+" or "−" buttons displayed in column 120 of attribute component 105. In alternate embodiments other user interface controls may also be used to achieve a similar function. In the example shown in FIG. 1, a user has added four time-entry attributes. Each time-entry attribute may be allotted an optional reference as shown in column 125. Each attribute may optionally be of a particular type, as shown in column 135. The attribute name 130 is typically used to define the specific characteristics of the attribute. The time attributes shown in FIG. 1 and described above are for example only and the number and type of time attributes may vary depending on the implementation. Attributes may be chosen based on, amongst others, any value or any value of a certain attribute type, null values, values from a certain set of values, or may be defined using other time categories. For example, any value of a certain attribute type may be represented as "project=*" or "<<project>>=any"; null values as "null" or "hours/*null*/"; and included time categories by a reference to a category identifier: "TC-1" or "2XFd44lcvD".

Returning to FIG. 2, to overcome the limitations of the prior art, the present invention provides a logic component 110 that enables a functional user to select a logic template at step S220. As can be seen in FIG. 1, one or more predetermined or pre-built logic templates are provided wherein each logic template comprises a particular logic expression containing one or more variables. Such expressions may be as simple as "data meets/has [selected] attribute A", i.e. x=A, or may be complex expression with multiple terms and operators. In the example of FIG. 1, each variable comprises a group; wherein each group may comprise zero or more time-entry attributes. However, each variable need not comprise a group and may instead be assigned a single time-entry attribute. In the exemplary user interface 100 of FIG. 1, the user is provided with a number of radio buttons 140 wherein, when the user clicks on a particular button next to the required logic template, that template is selected, as indicated by control component 145. Each logic template may be selected from a configurable list of logic templates, wherein the logic templates displayed to the user may be populated when implementing the method or user interface, i.e. at run-time. This would allow logic templates to be added and removed from logic component 110 over time. The logic templates shown in FIG. 1 are for example only and the number and type of logic templates provided may vary depending on the implementation.

In the present embodiment, the selection of a particular logic template determines the content of group selection component 115. In FIG. 1, as a logic template ("Group A and Group B both match or Group C matches") has been selected which uses three variables or variable groups: group A, group B and group C; a number of control boxes 150 relating to each of these groups are displayed within the group selection component 115. If the user had alternatively selected the first logic template ("Group A matches") then a single control box 150 relating to group A may have been shown instead; likewise, for the second and third logic templates only boxes relating to group A and group B may have been displayed to the user. The term "control box" applies to any section of a graphical user interface that is delineated for a particular purpose and which may contain further user interface control components for data entry and manipulation. In other embodiments, control boxes for all variables or variable groups may be shown independent of any selection within logic component 110. In this case, certain aspects of the control components within each box may be disabled depending on the selected logic template.

Returning to FIG. 2, at step S230 the functional user selects and/or configures the variables used in the logic expression to define the data category. They do this by assigning zero or more of the time-entry attributes selected in step S210 to each variable, i.e. the attributes selected using component 105 of FIG. 1. In the present embodiment, which uses groups of variables within each logic template, the functional user may assign a plurality of attributes to each group. The user may also specify a logic rule for evaluating the attributes in each logic group, for example all attributes within a group may need to be met or any attributes within a group may be met.

To assign attributes to variables or variable groups the user is presented with group selection component 115 and control boxes 150. To select the optional logic rule for each group the user may also be presented with a control component such as control button 155, which on activation toggles between the one or more logic rules available. In FIG. 1 the user may select whether any of the attributes assigned to the group need to be met or whether all of the attributes assigned to the group need to be met. In the example shown in FIG. 1, any attribute in groups A and B may be met and all attributes in group C need be met. The selection of "any" selects an "OR" logic rule and the selection of "all" selects an "AND" logic rule for the appropriate group.

In the example of FIG. 1, the time-entry attributes assigned to each group are selected using check boxes 160. In alternate embodiments, a different control component known in the art may be used. As the user adds attributes using attribute component 105, multiple check boxes are added to each control box 150 in group selection component 115. Hence, in FIG. 1 there are four check boxes 160 that have been added for each of the attributes shown in the attribute component 105. If the user was to add a further attribute using column 120 then another check box may be added to those shown in component 115; likewise if an attribute was to be removed from those shown in attribute component 105, the corresponding check box will also be removed from the group of check boxes 160. If necessary, the group selection component 115 may be enlarged as more attributes are added using attribute component 105 or a fixed size group selection component 115 may be provided with scroll bars.

In the example of FIG. 1, a user has selected time-entry attribute "2" to form group A, any of time-entry attributes "1" and "3" to form group B and time-entry attribute "4" to form group C. Selected attributes are shown by a check 165 in the appropriate check boxes 160.

Returning to FIG. 2, at step S240, once all required variables have been selected and/or configured, a logic expression is produced. The logic expression may be produced in real-time after every update to the user interface 100 or may be generated when the functional user clicks on a "generate" control. In a preferred embodiment an "English" or natural language statement is provided dynamically in expression control box 170. In the present example, this sentence reads: "The time category will result in a match when any attributes in Group A (standard hours) are met AND when any attributes in Group B (project Foo or Gee) are met, OR when all attributes in Group C (overtime hours) are met". The sentence 175 will be updated as the time-entry attributes are associated to the appropriate logic groups and/or when a different logic template is selected. At step S240 a logic expression is produced wherein the selected time-entry attribute values are retrieved and placed within the selected logic template and the appropriate operators are added to each group definition. The data category may be stored with an associated database, wherein the stored data category will typically comprise a programming or data processing expression that uses the data selected by the user but that would commonly be of a form unintelligible to the functional user. For example, in the present example the data category may be stored as (((hours type=standard) AND ((project=Foo) OR (project=Gee))) OR (hours type=overtime)), wherein the attributes or operators may be replaced with an appropriate index and/or binary or hexadecimal form.

The present invention provides numerous advantages when compared to the prior art. The user interface 100 enables a functional user to correctly set up a data category on a first attempt and provides increased usability. The provided logic template also offers an understandable solution for non-technical users. The "English" sentence 175 provides a definition of a bespoke configurable time data category that can be easily understood by users. The present invention avoids requiring a functional user, for example an administrator or other non-technical member of staff, to write logic expressions when they may not be qualified to do so or understand what they are doing. The present invention provides a powerful logical expression builder that enables the gap to be bridged between functional and technical expertise.

Figure 3:
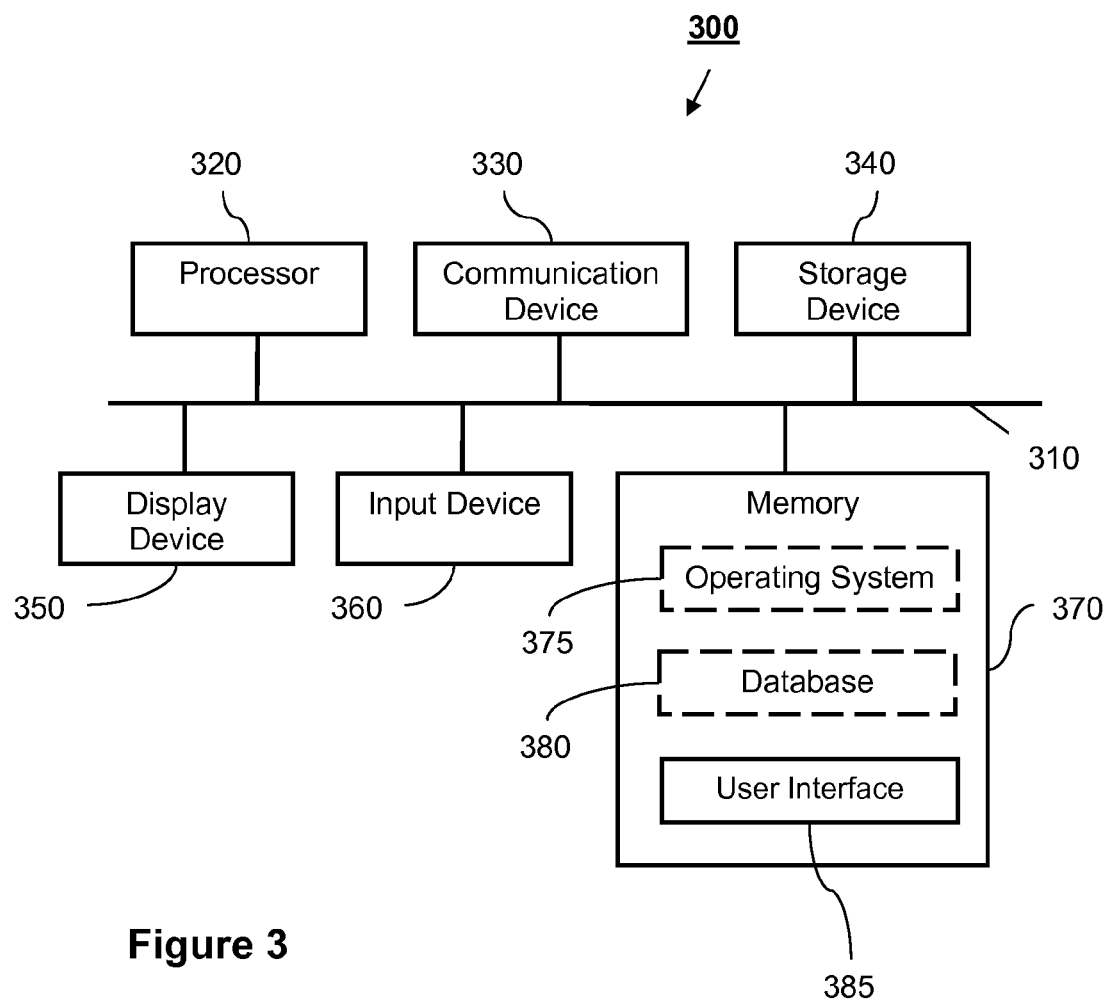
FIG. 3 illustrates an exemplary hardware device that may be used to implement the present invention.

The user interface 100 or method 200 may be implemented using the computer system 300 of FIG. 3. FIG. 3 is provided as an example for the purposes of explaining the invention and one skilled in the art would be aware that the components of such a system may differ depending on requirements and user preference. The computer system of FIG. 3 comprises one or more processors 320 connected to a system bus 310. Also connected to the system bus 310 is working memory 370, which may comprise any random access or read only memory (RAM/ROM), display device 350 and input device 360. Display device 350 is used to present the user interface 100 to a user. The user then interacts with the user interface 100 using input device 360, which may comprise, amongst others known in the art, a mouse, pointer, keyboard or touch-screen. If a touch-screen is used display device 350 and input device 360 may comprise a single input/output device. The computer system may also optionally comprise one or more storage devices 340 and communication device 330, which may enable communication over a network (non-shown). Storage devices 340 may be any known local or remote storage system using any form of known storage media.

In use, computer program code is loaded into working memory 370 to be processed by the one or more processors 320. In the example of FIG. 3, an operating system (OS) 375 is optionally loaded into memory 750 together with optional computer-program code for implementing a database system 380. The data category defined using the present invention may be used within database system 380 or by other applications. Working memory 370 also comprises computer-program code 385 for implementing the user interface 100. The user interface 100 may be implemented using library components, for example Microsoft Windows Application Programming Interfaces (APIs) or Java Swing libraries. The OS 375 and/or the computer-program code 380 and 385 may comprise suitably configured computer program code to enable the proper functioning of the computer system as described above.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

Generally, any of the functionality described in this text or illustrated in the figures can be implemented using software, firmware (e.g., fixed logic circuitry), manual computer-implemented processing, or a combination of these implementations. The terms "component" or "function" as used herein generally represents software, firmware, or a combination of software and firmware. For instance, in the case of a software implementation, the terms "component" or "function" may refer to program code that performs specified tasks when executed on a processing device or devices (e.g., processor(s) 320). The program code can be stored in one or more computer readable memory devices as described above. The illustrated separation of components and functions into distinct units may reflect an actual physical grouping and allocation of such software and/or hardware, or can correspond to a conceptual allocation of different tasks performed by a single software program and/or hardware unit.

What is claimed is:

1. A method for defining categories for a set of data comprising:
    selecting, by a computing processor, a plurality of attributes from a group of attributes, each attribute describing a possible data item in the set of data;
    selecting, by the computing processor, a logic template from a group of logic templates, each logic template comprising a predetermined logic expression containing one or more variables; and
    assigning, by the computing processor, one or more selected attributes to each variable within the selected logic template;
    producing, by the computing processor, a logic expression defining the data category based on the assigned one or more selected attributes and predetermined logic expression of the selected logic template; and
    validating, by the computing processor, one or more data entries stored in a database based on the data category defined by the produced logic expression.

2. The method of claim 1, wherein the data category comprises a category for time data and/or the plurality of attributes comprise time attributes.

3. The method of claim 1, wherein the predetermined logic expression comprises two or more logic groups of one or more variables linked by a logical operator.

4. The method of claim 3, wherein the assigning of the one or more selected attributes to each variable within the selected the logic template further comprises assigning one or more selected attributes to each logic group.

5. The method of claim 4, further comprising selecting, by the computing processor, a predetermined logic rule for governing the relationship between the attributes in each logic group, said logic rule forming part of the logic expression defining the data category.

6. The method of claim 1, further comprising using, by the computing processor, the data category in database operations.

7. The method of claim 1, further comprising generating, by the computing processor, a natural language statement describing the logic expression defining the data category.

8. The method of claim 1, further comprising adding, editing or removing, by the computing processor, a logic template from the group of logic templates.

9. A system comprising:
a processor; and
a memory coupled with and readable by the processor and having stored therein a sequence of instructions which, when executed by the processor, causes the processor to define categories for a set of data by:
selecting a plurality of attributes from a group of attributes, each attribute describing a possible data item in the set of data;
selecting a logic template from a group of logic templates, each logic template comprising a predetermined logic expression containing one or more variables; and
assigning one or more selected attributes to each variable within the selected logic template;
producing, by the computer system, a logic expression defining the data category based on the assigned one or more selected attributes and predetermined logic expression of the selected logic template; and
validating, by the computer system, one or more data entries stored in a database based on the data category defined by the produced logic expression.

10. The system of claim 9, wherein the data category comprises a category for time data and/or the plurality of attributes comprise time attributes.

11. The system of claim 9, wherein the predetermined logic expression comprises two or more logic groups of one or more variables linked by a logical operator.

12. The system of claim 11, wherein the assigning of the one or more selected attributes to each variable within the selected the logic template further comprises assigning one or more selected attributes to each logic group.

13. The system of claim 12, further comprising selecting a predetermined logic rule for governing the relationship between the attributes in each logic group, said logic rule forming part of the logic expression defining the data category.

14. The system of claim 9, further comprising using the data category in database operations.

15. The system of claim 9, further comprising generating a natural language statement describing the logic expression defining the data category.

16. The system of claim 9, further comprising adding, editing or removing a logic template from the group of logic templates.

17. A computer-readable memory having stored therein a sequence of instructions which, when executed by a processor, causes the processor to define categories for a set of data by:
selecting a plurality of attributes from a group of attributes, each attribute describing a possible data item in the set of data;
selecting a logic template from a group of logic templates, each logic template comprising a predetermined logic expression containing one or more variables; and
assigning one or more selected attributes to each variable within the selected logic template;
producing, by the computer system, a logic expression defining the data category based on the assigned one or more selected attributes and predetermined logic expression of the selected logic template; and
validating, by the computer system, one or more data entries stored in a database based on the data category defined by the produced logic expression.

18. The computer-readable memory of claim 17, wherein the data category comprises a category for time data and/or the plurality of attributes comprise time attributes.

19. The computer-readable memory of claim 17, wherein the predetermined logic expression comprises two or more logic groups of one or more variables linked by a logical operator.

20. The computer-readable memory of claim 19, wherein the assigning of the one or more selected attributes to each variable within the selected the logic template further comprises assigning one or more selected attributes to each logic group.

21. The computer-readable memory of claim 20, further comprising selecting a predetermined logic rule for governing the relationship between the attributes in each logic group, said logic rule forming part of the logic expression defining the data category.

22. The computer-readable memory of claim 17, further comprising using the data category in database operations.

23. The computer-readable memory of claim 17, further comprising generating a natural language statement describing the logic expression defining the data category.

24. The computer-readable memory of claim 17, further comprising adding, editing or removing a logic template from the group of logic templates.

* * * * *